United States Patent [19]

Humpert et al.

[11] 4,187,880
[45] Feb. 12, 1980

[54] SINGLE-HANDLE MIXING VALVE

[75] Inventors: Jürgen Humpert; Hans-Joachim Eckel, both of Hemer; Rolf Behrenberg, Schwerte, all of Fed. Rep. of Germany

[73] Assignee: ITT Industries, Incorporated, New York, N.Y.

[21] Appl. No.: 920,369

[22] Filed: Jun. 29, 1978

[30] Foreign Application Priority Data

Jul. 14, 1977 [DE] Fed. Rep. of Germany ....... 2731809

[51] Int. Cl.² ............................................ F16K 11/02
[52] U.S. Cl. ............................................ 137/625.17
[58] Field of Search .................. 137/625.17, 549, 550; 251/127, 314

[56] References Cited

U.S. PATENT DOCUMENTS

| | | | |
|---|---|---|---|
| 3,185,176 | 5/1965 | Webb | 137/625.17 |
| 3,282,295 | 11/1966 | Skriletz et al. | 137/625.17 |
| 3,782,417 | 1/1974 | Moen | 137/625.17 |
| 3,835,887 | 9/1974 | Mongerson et al. | 137/625.17 |
| 4,033,373 | 7/1977 | Manoogian et al. | 137/625.17 |

Primary Examiner—William R. Cline
Attorney, Agent, or Firm—James B. Raden; Donald J. Lenkszus

[57] ABSTRACT

A single-handle mixing faucet of the type having a rotatable axially movable hollow piston for the selection of the mixing ratio and flow volume includes improved seals for sealing between the walls of the valve casing and a cylindrical sleeve inserted into the valve casing. The seals are of two piece construction and include a rim-type molded body bent to follow the configuration of the sleeve and a sealing member which is carried by the molded body. Inlet apertures on the sleeve are longitudinal slots of specific configuration. Noise silencing is enhanced by use of perforated disks or a porous cylinder.

9 Claims, 5 Drawing Figures

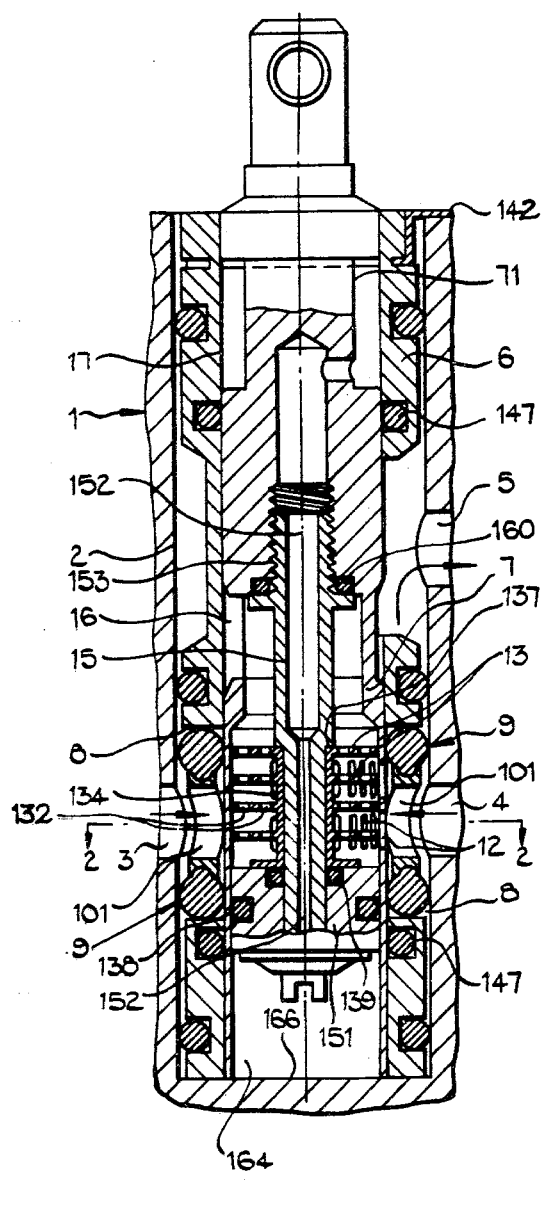
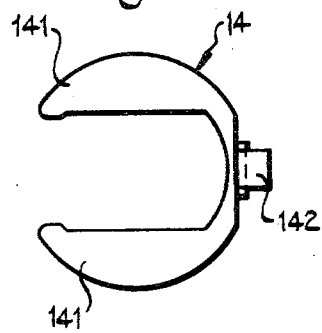

SINGLE-HANDLE MIXING VALVE

BACKGROUND OF THE INVENTION

This invention relates to a single-handle mixing valve of the type having a cartridge-like valve assembly.

One common type of mixing faucet uses a single lever to control both volume and temperature of water discharge. More specifically, reciprocation of the lever controls the volume of discharge and rotation of the lever controls the volume. In certain such mixing faucets, a round cord rubber ring is used for sealing between the valve casing and the cylindrical sleeve of the valve cartridge around the inlet apertures. It has been found that such sealing rings have a relatively short life. Also, cross-flow between the two supply lines is a problem when the valve is in the closed position and there are pressure differences between the supply lines.

Flow noise in the valve cartridge is a further problem of prior mixing faucets.

Accordingly, it is one object of this invention to provide a mixing valve in which the friction and the wear of the sealing elements is reduced to a minimum.

It is another object of this invention to preclude cross-flow between the supply lines.

It is a further object of the invention to provide a mixing faucet of compact design.

SUMMARY OF THE INVENTION

In accordance with the principles of the invention, a mixing valve is obtained wherein friction between the sealing elements and sealing surfaces is reduced to a minimum bringing about a reduced wear of ths sealing elements while precluding cross-flow between the supply lines.

A mixing valve in accordance with the invention includes a hollow piston jacket within a cylindrical sleeve. The cylindrical sleeve carries sealing elements adjacent each fluid inlet. Each sealing element is of two piece construction including a shaping ring and a sealing cord ring. The shaping ring is molded to conform to the curvature of the hollow piston jacket and includes a circumferential channel on its outer surface. The sealing cord ring includes a sealing section of circular cross-section and a bead molded on the inside of the ring. The bead corresponds in shape to the channel on the shaping ring such that the bead of the sealing cord ring may be buttoned into the channel.

In accordance with the invention, the hollow piston jacket also includes a plurality of longitudinal slots to control the discharge volume and mixing ratio. The interaction between the sealing elements and the longitudinal slots enhances the service life of the sealing elements.

Further in accordance with the invention, flow noises generated in the mixing valve are reduced by securing apertured disks within the hollow piston. The diameter of each aperture corresponds to the width of the longitudinal slots.

BRIEF DESCRIPTION OF THE DRAWINGS

The invention may be better understood from a reading of the following detailed description taken in conjunction with the drawings in which like numerical designations are used to identify like parts and in which:

FIG. 1 is a longitudinal section of a mixing valve shown with a partly drawn valve casing and without an operating head-piece;

FIG. 2 is a cross-section of the valve of FIG. 1 taken along the line 2—2;

FIG. 3 illustrates a locking element for retaining the cartridge section in the valve casing of FIG. 1;

Figure 4:
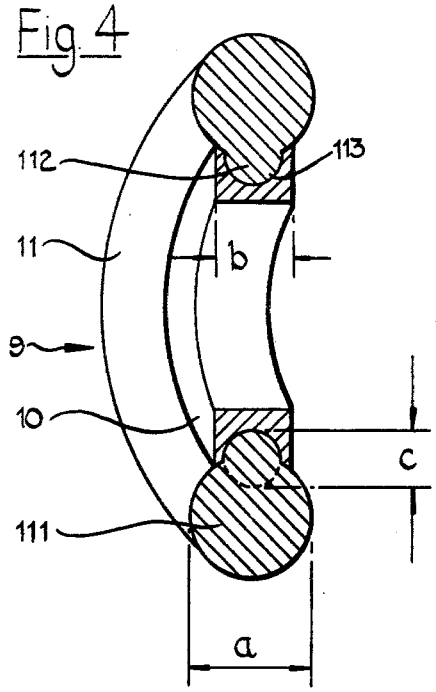
FIG. 4 illustrates on an enlarged scale a section through a sealing element according to FIG. 1.

DETAILED DESCRIPTION OF THE DRAWINGS:

FIG. 1 illustrates a partly shown valve casing 1 having diametrically opposed inlet openings 3 and 4 which are respectively connected to hot and cold water supplies, and an upstream discharge outlet 5. The casing 1 includes a cylindrical blind bore. A self-contained valve cartridge is inserted into the bore and secured in its axial direction by a head piece which is not shown but which may be cf conventional design.

The valve cartridge includes a sleeve 6 and a hollow piston 7 arranged in the sleeve 6. A clasp-cum-spring type bar 14 retains the hollow piston 7 within the sleeve 6 so that the hollow piston 7 may be axially shifted within limits. As can be more clearly seen from FIG. 3, the bar 14 includes two spring-type arms 141 for engaging a restricted portion 71 of the hollow piston, and a nose 142 which engages a corresponding groove in the valve casing 1 to secure the sleeve 6 from turning.

The sleeve 6 has two diametrically opposed bores 8 radially arranged in the sleeve 6. A sealing element 9 is inserted in each of the bores 8 and seated against the bottom surface 81 of each bore 8 as can be clearly seen in FIG. 2.

Each sealing element 9 is of two piece construction as can be more clearly seen in FIG. 4. The sealing element 9 includes a shaping ring 10 and a sealing ring 11. The shaping ring 10 is a rim shaped piece having a central aperture 101 and molded such that it follows the curvature of the external surface of the hollow piston 7, and further such that it includes a circumferential channel 113. The sealing ring 11 includes a sealing section 111 having a circular cross-section and an integrally formed bead 112 molded on the inside of the ring. The diameter of the cross-section of the sealing section 111 designated as "a" in FIG. 4 is chosen such that a pre-loaded seal is provided with the surface of bore 2 and with the exterior surface of hollow piston 7.

Longitudinal slots 12 are arranged in two rows over approximately two-thirds of the circumference of the hollow piston 7 to control the water discharge volume and the mixing ratio. The hollow piston 7 further includes mixed water outlet apertures 16.

Figure 5:
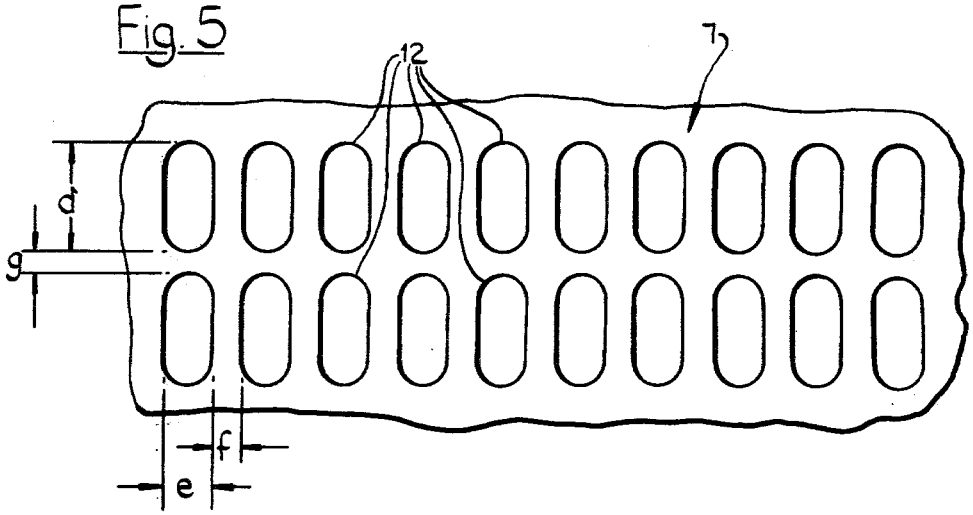
FIG. 5 illustrates on an enlarged scale a section of the wall of the hollow piston of FIG. 1.

The axial opening of the hollow piston 7 is adapted to receive a spindle 15 which is supported thereon by a threaded fastening 153. A seal 160 is provided around the threaded union. The downstream portion of the spindle 15 is of reduced diameter. The reduced diameter portion carries punched disks 13 and a plug 151. As can be more clearly seen in FIG. 2, each punched disk 13 has two circular rows 131 of apertures 132. The diameter of each aperture corresponds to the width e of the longitudinal slots 12 in the wall of the hollow piston as shown in FIG. 5. Molded to each disk 13 is a spacer 134 to provide proper spacing. The disks 13 are positionally retained on the spindle 15 by the shoulder 137 and the plug 151. Plug 151 is provided to close the axial opening in the hollow body and includes O-ring seals 138 and 139 to prevent seepage between the plug and the hollow piston 7 and between the plug and the spindle 15. The spindle 15 includes a passage 152 for ventilating and venting the chamber 164 formed between the plug 152 and the bottom wall 166 of the blind bore.

To reduce the cost of machining the hollow piston 7 which slides on the sealing elements 9, the hollow piston 7 is of largely uniform outside diameter. The sealing elements 9 and sealing rings 141 are fitted into the sleeve 6 which has a continuous cylindrical bore 17. To enhance the sliding properties of the hollow piston 7 within the bore 17, the outer surface of the piston 7 is subjected to brushing after the longitudinal slots 12 and the mixed water outlet 16 have been made and the piston has been properly sized. By machining in this manner, a perfectly harmonical transition is achieved between the piston wall and the slot edges prior to final surface treatment.

Specific relationships between dimensions of the sealing element 9 and the longitudinal slots 12 have been found to be particularly favorable. These relationships will be best understood by referring to FIGS. 4 and 5. The cross-sectional diameter of the sealing section 111 is designated as "a". If $a = 1.0$, then the following relationships have been determined advantageous. The maximum width of the bead 112, corresponding to the width of the molded body 10 and designated as "b", has the relative dimension $b = 0.6$. The cross-sectional shape of the bead 112 is determined by the arc of a circle having a diameter $c = 0.25$ with the center of this arc corresponding with the arc of the circle of the sealing component 111 and the connection to the maximum bead width being formed by tangents. The slots 12 are semi-circular at the ends and have a relative length of $d = 0.9$ and a relative width of $e = 0.4$. The relative spacing between the slots in a row is $f = 0.28$ and the relative spacing between the slot rows is $g = 0.27$.

The punched disks 12 which have been described hereinabove are provided to reduce flow noises through the valve. Instead of the punched disks, a cylindrical porous body may be arranged on the spindle 15 in the vicinity of the slots 12 to form an axially parallel annular passage within the piston 7. The outflowing water will pass along the jacket of the porous body which may be a woven sieve fabric wound on the spindle. Such an alternate arrangement will, as in the punched disks 12, substantially reduce noise generation in the area of the sealing elements 9 and the longitudinal slots 12.

What is claimed is:

1. A single-handle mixing valve comprising:
   a valve casing having a central bore, a pair of first fluid inlets and a first fluid outlet;
   a cylindrical sleeve within said bore and including a pair of radially disposed inlet bores in communication with said first fluid inlets and a fluid outlet bore in communication with said first fluid outlet;
   a hollow piston disposed within said sleeve, said piston being rotatable to control the fluid mixing ratio and axially shiftable to control the fluid flow volume;
   a pair of sealing elements, each sealing element being carried in a corresponding one of said inlet bores;
   each of said sealing elements comprising:
   a rim-type molded body having a central aperture and arcuately formed to correspond to the outer surface curvature of said piston, and a sealing cord ring buttoned on said molded body, said sealing cord ring providing a seal between said sleeve and said casing and between said sleeve and said piston;
   said piston having a plurality of longitudinal slots radially arranged along the axial direction of said piston, each of said slots having a length and a width of smaller dimension than the cross-sectional diameter of said sealing cord ring; and
   noise silencing means disposed within said piston.

2. A single-handle mixing valve in accordance with claim 1, wherein said noise silencing means comprises a plurality of spaced-apart apertured disks disposed within said piston transverse to the longitudinal axis of said piston.

3. A single-handle mixing faucet in accordance with claim 2, wherein said sealing cord ring includes a sealing portion of generally circular cross-section and a bead molded to the inside of said ring; the maximum width of said bead corresponds to the width of said molded body; said maximum width being approximately 0.6 the diameter of said sealing portion, said bead having a cross-sectional shape determined by the arc of a circle having a diameter of approximately 0.25 the diameter of said sealing portion; and the center of said circle coinciding with the intersection of the arc of the circular shape of said sealing portion and adjacent tangents.

4. A single-handle mixing faucet according to claim 3, wherein said plurality of longitudinal slots are arranged as two parallel rows arranged over a portion of the wall circumference of said piston, each said slot having a length of approximately 0.9 the diameter of said sealing portion and a width of approximately 0.4 the diameter of said sealing portion; each slot in a row being spaced approximately 0.28 the diameter of said sealing portion from an adjacent slot; and said rows spaced-apart approximately 0.27 the diameter of said sealing portion.

5. A single-handle mixing faucet according to claim 4, further comprising:
   a spindle connected to said piston and extending within a portion of said piston;
   a plurality of spaced-apart disks having apertures and supported on said spindle transverse to the longitudinal axis of said piston;
   a sealing plug connected to one end of said spindle; and
   said spindle including an axial venting passage.

6. A single-handle mixing faucet according to claim 5, wherein each of said disks includes an integrally formed spacer and each said disk aperture has a diameter corresponding to the width of said longitudinal slots.

7. A single-handle mixing faucet in accordance with claim 6, wherein said sleeve has a continuous cylindrical bore adapted to receive said piston, and said piston has a substantially continuous cylindrical jacket.

8. A single-handle mixing valve in accordance with claim 7, wherein the edges of said longitudinal slots have been subjected to brushing prior to final surface and after hollow piston has been machined to a proper size.

9. A single-handle mixing faucet in accordance with claim 1, wherein said noise silencing means comprises a cylindrical porous cylinder supported within said piston, said cylinder and the inner wall of said piston forming an axial annular fluid flow passage.

* * * * *